US011856167B2

(12) United States Patent
Iritani

(10) Patent No.: US 11,856,167 B2
(45) Date of Patent: Dec. 26, 2023

(54) IMAGE FORMING APPARATUS CAPABLE OF ON-OFF CONTROL OF OPERATING KEY LAMP ACCORDING TO ANBIENT ILLUMINANCE

(71) Applicant: KYOCERA Document Solutions Inc., Osaka (JP)

(72) Inventor: Kazunobu Iritani, Osaka (JP)

(*) Notice: Subject to any disclaimer, the term of this patent is extended or adjusted under 35 U.S.C. 154(b) by 0 days.

(21) Appl. No.: 17/976,851

(22) Filed: Oct. 30, 2022

(65) Prior Publication Data

US 2023/0133931 A1 May 4, 2023

(30) Foreign Application Priority Data

Nov. 1, 2021 (JP) .................................. 2021-178660

(51) Int. Cl.
*H04N 1/60* (2006.01)
*H04N 1/00* (2006.01)

(52) U.S. Cl.
CPC ..... *H04N 1/00896* (2013.01); *H04N 1/00037* (2013.01); *H04N 1/0049* (2013.01); *H04N 1/00384* (2013.01); *H04N 1/00835* (2013.01)

(58) Field of Classification Search
None
See application file for complete search history.

(56) References Cited

U.S. PATENT DOCUMENTS

| | | | | |
|---|---|---|---|---|
| 11,523,018 B1* | 12/2022 | Miyahara | ........... | H04N 1/00896 |
| 2006/0136762 A1* | 6/2006 | Yoshioka | ............. | G09G 3/3406 |
| | | | | 713/320 |
| 2010/0328284 A1* | 12/2010 | Noguchi | ............... | G06F 1/3203 |
| | | | | 315/307 |
| 2012/0105896 A1* | 5/2012 | Ito | ...................... | H04N 1/00896 |
| | | | | 358/1.14 |
| 2013/0049610 A1* | 2/2013 | Chen | ..................... | G08B 15/002 |
| | | | | 315/159 |
| 2013/0063787 A1* | 3/2013 | Yoshioka | ........... | H04N 1/00496 |
| | | | | 358/406 |
| 2013/0222831 A1* | 8/2013 | Konosu | ............. | H04N 1/00835 |
| | | | | 358/1.13 |
| 2014/0160007 A1* | 6/2014 | Lee | ...................... | H04B 1/3888 |
| | | | | 345/156 |
| 2016/0142575 A1* | 5/2016 | Yokoyama | ......... | H04N 1/00896 |
| | | | | 358/1.15 |
| 2019/0012122 A1* | 1/2019 | Miyata | ................... | G06F 3/1229 |
| 2021/0092250 A1* | 3/2021 | Iritani | ................ | G03G 15/5004 |

FOREIGN PATENT DOCUMENTS

JP 2002139955 A 5/2002

* cited by examiner

*Primary Examiner* — Dung D Tran
(74) *Attorney, Agent, or Firm* — IP BUSINESS SOLUTIONS, LLC

(57) ABSTRACT

An image forming apparatus includes an operating key, an illuminance sensor, and a controller. The operating key contains a lamp. The illuminance sensor detects an ambient illuminance. The controller controls turning on and off of the lamp. The operating key functions as a first trigger for return from a power-saving mode to a normal mode. The controller turns the lamp off when the ambient illuminance detected by the illuminance sensor in the power-saving mode is equal to or more than a first threshold value, and the controller turns the lamp on when the ambient illuminance detected by the illuminance sensor in the power-saving mode is less than the first threshold value.

3 Claims, 4 Drawing Sheets

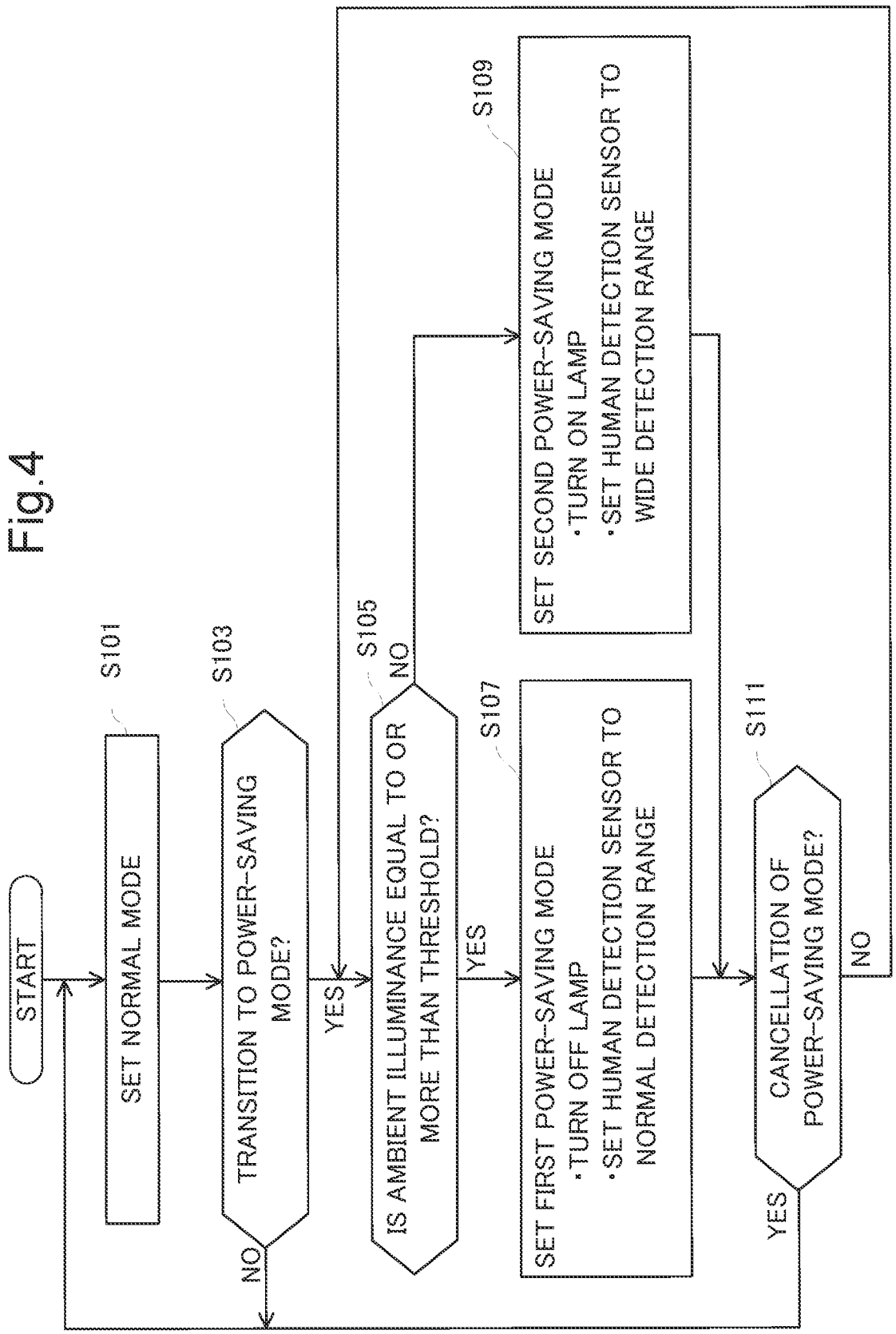

IMAGE FORMING APPARATUS CAPABLE OF ON-OFF CONTROL OF OPERATING KEY LAMP ACCORDING TO ANBIENT ILLUMINANCE

INCORPORATION BY REFERENCE

This application claims priority to Japanese Patent Application No. 2021-178660 filed on 1 Nov., 2021, the entire contents of which are incorporated by reference herein.

BACKGROUND

The present disclosure relates to image forming apparatuses.

There is generally known an image forming apparatus that predicts its frequency of use based on the number of persons passing by, the surrounding brightness or other factors and, upon determination of low frequency of use, transitions to a power-saving mode for decreasing the fixation temperature.

SUMMARY

A technique improved over the aforementioned technique is proposed as one aspect of the present disclosure.

An image forming apparatus according to an aspect of the present disclosure includes an operating key, an illuminance sensor, and a controller. The operating key contains a lamp. The illuminance sensor detects an ambient illuminance. The controller includes a processor and controls, through the processor executing a control program, turning on and off of the lamp. The operating key functions as a first trigger for return from a power-saving mode, where power consumption is reduced relative to a normal mode, to the normal mode. The controller turns the lamp off when the ambient illuminance detected by the illuminance sensor in the power-saving mode is equal to or more than a first threshold value, and the controller turns the lamp on when the ambient illuminance detected by the illuminance sensor in the power-saving mode is less than the first threshold value.

BRIEF DESCRIPTION OF THE DRAWINGS

FIG. 4 is a flowchart showing an example of an operation of a controller.

DETAILED DESCRIPTION

Hereinafter, a description will be given of an embodiment of the present disclosure with reference to the drawings. Throughout the drawings, the same or corresponding parts are designated by the same references and further explanation thereof will be omitted.

Figure 1:
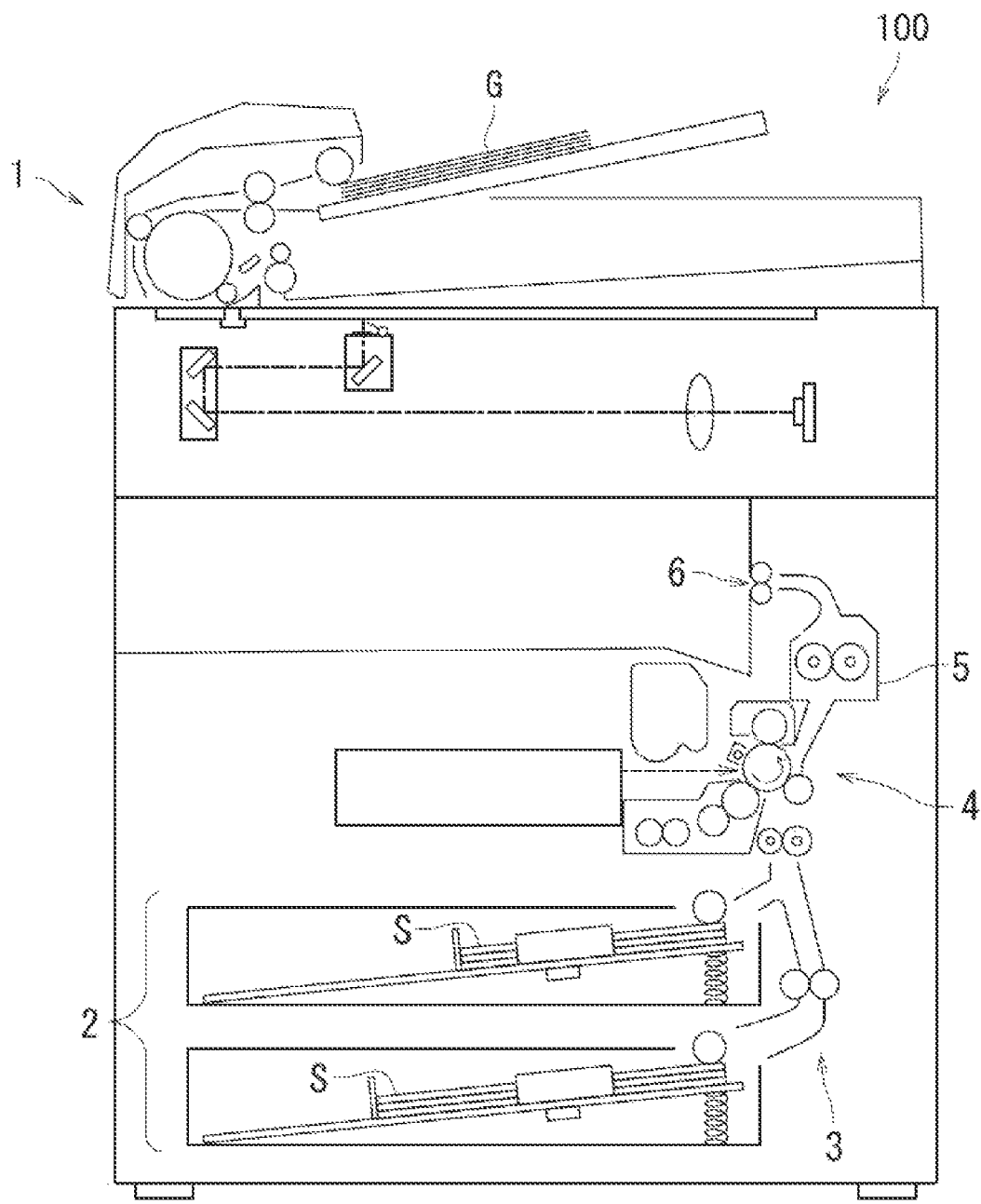
FIG. 1 is a schematic view showing an example of a structure of an image forming apparatus.

Referring to FIG. 1, a description will be given of an image forming apparatus 100 according to an embodiment of the present disclosure. FIG. 1 is a schematic view showing an example of a structure of the image forming apparatus 100. The image forming apparatus 100 is, for example, a copier, a printer, a facsimile machine or a multifunction peripheral combining these functions. In this embodiment, the image forming apparatus 100 is a black-and-white multifunction peripheral.

As shown in FIG. 1, the image forming apparatus 100 includes a reading device 1, a sheet feed device 2, a conveyance device 3, an image forming device 4, a fixing device 5, and a discharge device 6.

The reading device 1 reads an image of an original document G. The reading device 1 generates image data representing the read image. The sheet feed device 2 accommodates a plurality of sheets S and feeds the sheet S to the conveyance device 3. The sheet S is made of, for example, paper or synthetic resin. The conveyance device 3 includes a plurality of conveyance roller pairs and conveys the sheet S to the image forming device 4.

The image forming device 4 electrophotographically forms a toner image on the sheet S. The image forming device 4 includes a photosensitive drum, a charging device, an exposure device, a developing device, a toner supply device, a transfer device, a cleaning device, and a destaticizing device. The image forming device 4 forms a toner image representing the image of an original document G, for example, based on the above-described image data. The fixing device 5 applies heat and pressure to the toner image to fix the toner image on the sheet S. The conveyance device 3 conveys the sheet S bearing the toner image fixed thereon to the discharge device 6. The discharge device 6 discharges the sheet S to the outside of the image forming apparatus 100.

Figure 2:
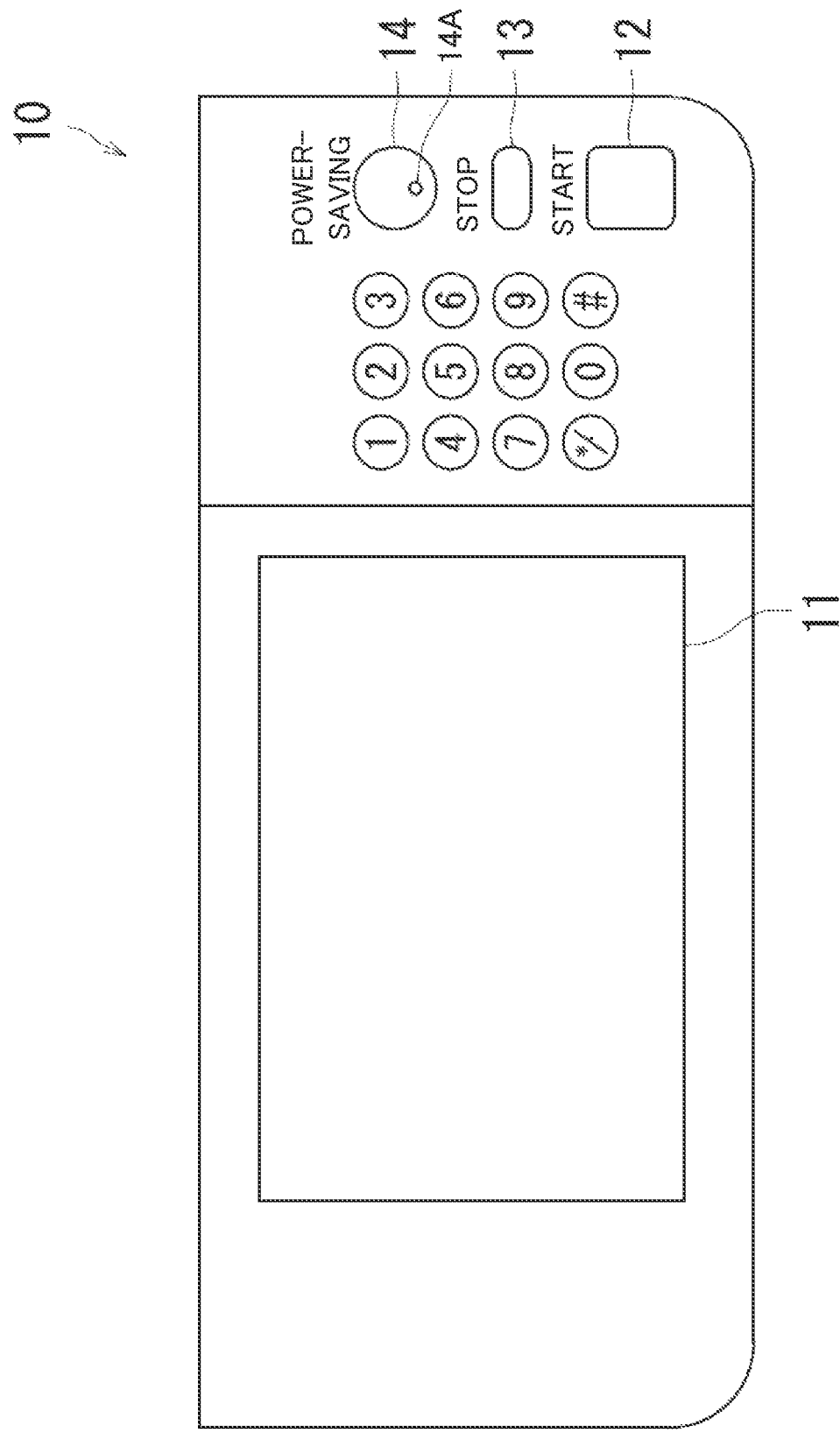
FIG. 2 is a plan view showing an example of a structure of an operation device.

Next, referring to FIGS. 1 and 2, a description will be given of a structure of an operation device 10 included in the image forming apparatus 100. FIG. 2 is a plan view showing an example of a structure of the operation device 10.

As shown in FIG. 2, the operation device 10 includes a touch panel 11 and various keys. The operation device 10 includes, as various keys, a Start key 12 and a Stop key 13.

The touch panel 11 is, for example, a device in which the function of an input device is added to a liquid crystal panel for use in displaying information. The Start key 12 is a key for use when a user inputs an instruction to start a job. The Stop key 13 is a key for use when the user inputs an instruction to cancel or suspend a job being executed.

The operation device 10 further includes a Power-Saving key 14 as one of the various keys. The Power-Saving key 14 is a key for use when the user inputs an instruction to transition from the normal mode to the power-saving mode and an instruction to return from the power-saving mode to the normal mode. The power-saving mode is a mode where the power consumption is reduced relative to the normal mode. In the power-saving mode, for example, power feeding to a heater included in the fixing device 5 is stopped. The Power-Saving key 14 functions as a first trigger for the return from the power-saving mode to the normal mode. The Power-Saving key 14 corresponds to an example of the "operating key".

The Power-Saving key 14 contains a lamp 14A. The lamp 14A contains, for example, a light-emitting diode. The lamp 14A turned on indicates, with light, the location of the Power-Saving key 14 on the operation device 10 to the user.

Figure 3:
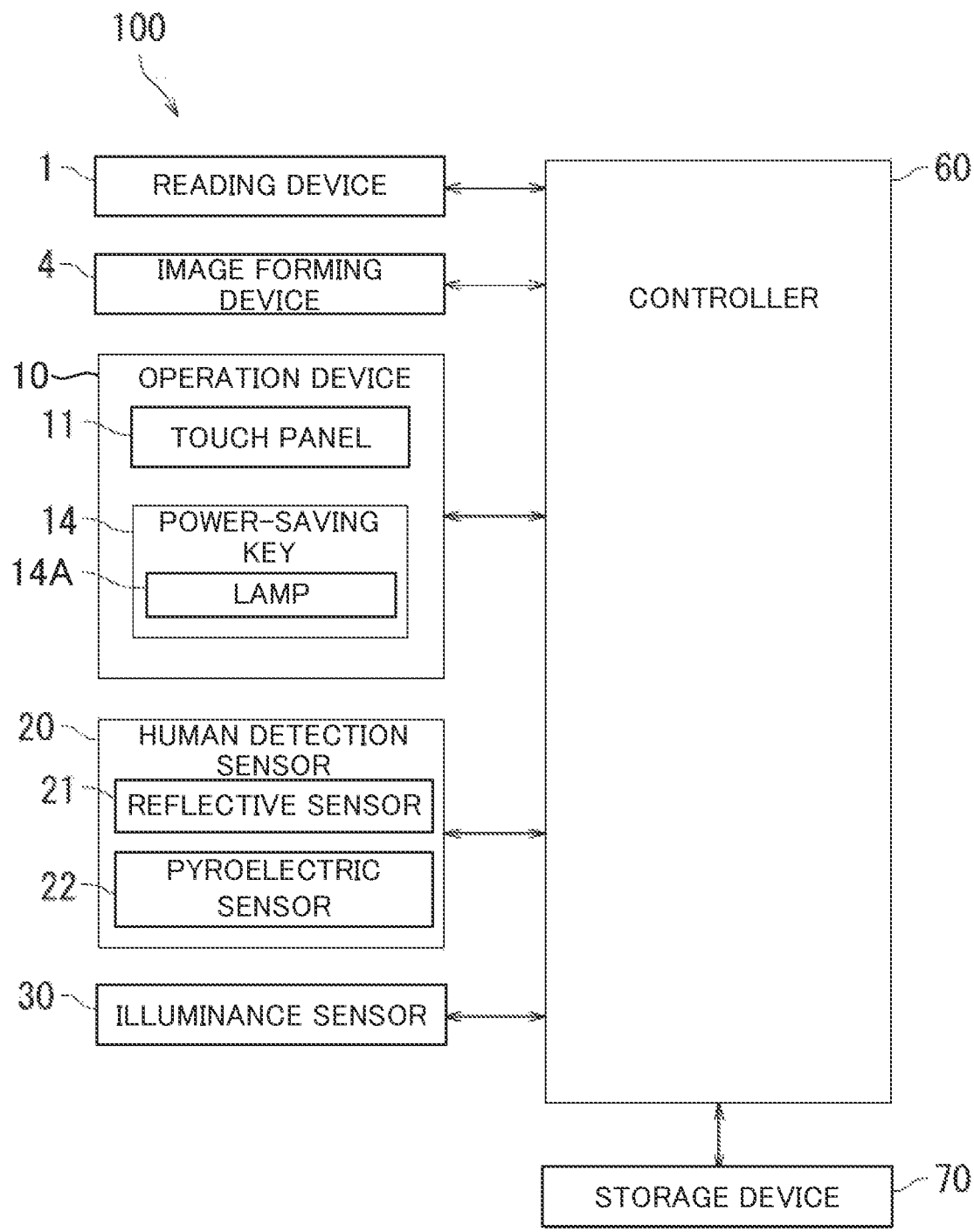
FIG. 3 is a block diagram showing an example of a circuit configuration of the image forming apparatus.

Next, referring to FIGS. 1 to 3, a description will be given of a circuit configuration of the image forming apparatus 100. FIG. 3 is a block diagram showing an example of a circuit configuration of the image forming apparatus 100.

As shown in FIG. 3, the image forming apparatus 100 further includes a human detection sensor 20, an illuminance sensor 30, a controller 60, and a storage device 70.

The human detection sensor 20 is an infrared ray sensor that has a variable human body detection range for detecting a human body and functions as a second trigger for the return from the power-saving mode to the normal mode. The human detection sensor 20 includes a reflective sensor 21 and a pyroelectric sensor 22. The reflective sensor 21 has a human body detection range set to a normal range (for example, a distance range of less than several tens of centimeters). The pyroelectric sensor 22 has a human body detection range set to a wide range (for example, a distance range of not less than 3 m and not more than 5 m) relative to the normal range.

The illuminance sensor 30 is a sensor for use in detecting the ambient illuminance of the image forming apparatus 100.

The storage device 70 comprises a plurality of storage devices and stores data and computer programs. The storage device 70 includes a main storage device, such as a semiconductor memory, and an auxiliary storage device, such as a hard disk drive.

The controller 60 includes a processor, such as a CPU (central processing unit). By executing a control program stored in the storage device 70, the controller 60 controls the components of the image forming apparatus 100. Specifically, the controller 60 controls the turning on and off of the lamp 14A according to the ambient illuminance detected by the illuminance sensor 30 in the power-saving mode. In addition, the controller 60 controls the human body detection range of the human detection sensor 20 by switching between the reflective sensor 21 and the pyroelectric sensor 22 according to the ambient illuminance detected by the illuminance sensor 30 in the power-saving mode.

Next, referring to FIGS. 1 to 4, a description will be given of an operation of the controller 60. FIG. 4 is a flowchart showing an example of an operation of the controller 60.

Step S101: The controller 60 executes the setting of the normal mode as shown in FIG. 4. In the normal mode, for example, power is fed to the heater included in the fixing device 5. When the processing in step S101 is completed, the controller 60 goes to the processing in step S103.

Step S103: The controller 60 determines whether or not to transition to the power-saving mode. When determining that a transition to the power-saving mode should be made (Yes in step S103), the controller 60 goes to the processing in step S105. When determining that a transition to the power-saving mode should not be made (No in step S103), the controller 60 goes back to the processing in step S101. For example, when the Power-Saving key 14 is pressed in the normal mode, the controller 60 determines that a transition to the power-saving mode should be made. Also when a predetermined transition time has passed while no operation is made in the normal mode, the controller 60 determines that a transition to the power-saving mode should be made. In the power-saving mode, for example, the controller 60 stops power feeding to the heater included in the fixing device 5. The power-saving mode includes a first power-saving mode and a second power-saving mode.

Step S105: The controller 60 determines whether or not the ambient illuminance is equal to or more than a threshold value. When determining that the ambient illuminance is equal to or more than the threshold value (Yes in step S105), the controller 60 goes to the processing in step S107. When determining that the ambient illuminance is less than the threshold value (No in step S105), the controller 60 goes to the processing in step S109.

Step S107: The controller 60 executes the setting of the first power-saving mode. In the first power-saving mode, the controller 60 controls the lamp 14A to turn it off. Additionally, in the first power-saving mode, the controller 60 performs control to set the human body detection range of the human detection sensor 20 to the normal range by allowing the reflective sensor 21 to operate as the human detection sensor 20. When the processing in step S107 is completed, the controller 60 goes to the processing in step S111.

Step S109: The controller 60 executes the setting of the second power-saving mode. In the second power-saving mode, the controller 60 controls the lamp 14A to turn it on. Additionally, in the second power-saving mode, the controller 60 performs control to set the human body detection range of the human detection sensor 20 to the wide range expanded relative to the normal range by allowing the pyroelectric sensor 22 to operate as the human detection sensor 20. When the processing in step S109 is completed, the controller 60 goes to the processing in step S111. When the ambient illuminance is less than the threshold value, any human body is less detectable. Therefore, the controller 60 may intermittently operate the pyroelectric sensor 22 for the sake of energy saving.

Step S111: The controller 60 determines whether or not to cancel the power-saving mode. When determining that the power-saving mode should be cancelled (Yes in step S111), the controller 60 goes back to the processing in step S101. When determining that the power-saving mode should not be cancelled (No in step S111), the controller 60 goes back to the processing in step S105. For example, when the Power-Saving key 14 is pressed in the power-saving mode, the controller 60 determines that the power-saving mode should be cancelled. Also when the human detection sensor 20 detects a human body in the power-saving mode, the controller 60 determines that the power-saving mode should be cancelled.

Meanwhile, when the surrounding area is dark at the return from the power-saving mode, the general image forming apparatus described previously has difficulty in identifying the location of the operating key, which presents a problem with operability.

On the contrary, in the above embodiment, when the ambient illuminance in the power-saving mode is less than the threshold value, the lamp 14A is turned on, which increases the visibility of the Power-Saving key 14. As a result, an image forming apparatus 100 having improved operability at the return from the power-saving mode is provided.

The description of the embodiment of the present disclosure has so far been given with reference to the drawings. However, the present disclosure is not limited to the above embodiment and can be implemented in various forms without departing the gist of the present disclosure. The various formations of the disclosure can be made by appropriately combining a plurality of components disclosed in the above embodiment. For example, some of all the components disclosed in the above embodiment may be deleted. For the sake of ease of understanding, the drawings are schematic representation, primarily of components. The number of components and so on shown in the drawings may be different from those of actual components for convenience of creation of the drawings. The components described in the above embodiments are merely illustrative, not particularly limited, and can be changed variously without substantially departing from the effects of the present disclosure.

For example, although the image forming apparatus 100 in the above embodiment is of electrophotographic printing type, the present disclosure is not limited to this embodiment. For example, the image forming apparatus 100 may be of ink-jet printing type. Although the image forming apparatus 100 in the above embodiment is a black-and-white multifunction peripheral, the present disclosure is not limited to this embodiment. For example, the image forming apparatus 100 may be a color multifunction peripheral.

Although in the above embodiment the operating key is the Power-Saving key 14, the present disclosure is not limited to this embodiment. For example, the operating key may be a power key that controls the mode and also controls the turning on and off power supply.

Although in the above embodiment the threshold value of the illuminance in controlling the lamp is equal to that of the illuminance in controlling human body detection, the present disclosure is not limited to this embodiment. For example, the controller 60 may turn the lamp 14A off when the ambient illuminance detected by the illuminance sensor 30 in the power-saving mode is equal to or more than a first threshold value, and the controller 60 may turn the lamp 14A on when the ambient illuminance detected by the illuminance sensor 30 in the power-saving mode is less than the first threshold value. On the other hand, the controller 60 may set the human body detection range to the normal range when the ambient illuminance detected by the illuminance sensor 30 in the power-saving mode is equal to or more than a second threshold value, and the controller 60 may set the human body detection range to the wide range when the ambient illuminance detected by the illuminance sensor 30 in the power-saving mode is less than the second threshold value. The first and second threshold values are different from each other.

INDUSTRIAL APPLICABILITY

The present disclosure is applicable in the field of image forming apparatuses.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
an operating key containing a lamp;
an illuminance sensor that detects an ambient illuminance; and
a controller that includes a processor and controls, through the processor executing a control program, turning on and off of the lamp,
wherein the operating key functions as a first trigger for return from a power-saving mode, where power consumption is reduced relative to a normal mode, to the normal mode, and
the controller turns the lamp off when the ambient illuminance detected by the illuminance sensor in the power-saving mode is equal to or more than a first threshold value, and the controller turns the lamp on when the ambient illuminance detected by the illuminance sensor in the power-saving mode is less than the first threshold value,
wherein the image forming apparatus further comprising a human detection sensor that has a variable human body detection range for detecting a human body and functions as a second trigger for the return from the power-saving mode to the normal mode,
wherein the controller sets the human body detection range to a normal range when the ambient illuminance detected by the illuminance sensor in the power-saving mode is equal to or more than a second threshold value, and the controller sets the human body detection range to a wide range relative to the normal range when the ambient illuminance detected by the illuminance sensor in the power-saving mode is less than the second threshold value.

2. The image forming apparatus according to claim 1, wherein
the human detection sensor comprises a reflective sensor and a pyroelectric sensor,
the reflective sensor has the human body detection range set to the normal range,
the pyroelectric sensor has the human body detection range set to the wide range, and
the controller switches between the reflective sensor and the pyroelectric sensor according to the ambient illuminance detected by the illuminance sensor.

3. The image forming apparatus according to claim 2, wherein the controller intermittently operates the pyroelectric sensor when the ambient illuminance detected by the illuminance sensor is less than the second threshold value.

* * * * *